United States Patent [19]

Mathews

[11] Patent Number: 5,456,042
[45] Date of Patent: Oct. 10, 1995

[54] SOLAR POWERED APPARATUS FOR TERMINATING FIRE ANTS

[76] Inventor: Charles A. Mathews, 305 E. Walters St., Lewisville, Tex. 75057

[21] Appl. No.: 214,578

[22] Filed: Mar. 18, 1994

[51] Int. Cl.$^6$ ................................................ A01M 1/02
[52] U.S. Cl. ................................ 43/111; 43/124; 43/131
[58] Field of Search ........................... 43/111, 124, 131, 43/132.1

[56] References Cited

U.S. PATENT DOCUMENTS

| | | | |
|---|---|---|---|
| 2,245,956 | 6/1941 | Baily | 43/124 |
| 3,043,046 | 7/1962 | McCoy | 43/111 |
| 3,093,761 | 6/1963 | Case | 43/124 |
| 5,241,777 | 9/1993 | Looker et al. | 43/124 |

Primary Examiner—P. Austin Bradley
Assistant Examiner—Jeanne M. Elpel

[57] ABSTRACT

A solar powered ant terminator comprising a pan with an upper edge and a planar lower surface and side walls therebetween adapted to be set on the ground adjacent to a colony of ants, a motor secured with respect to the upper surface of the pan with an output shaft for providing a rotational motion, a cam secured to the output shaft adapted to be rotated upon the activation of the motor, a striker plate secured to one upper edge of the pan adjacent to the rotating cam which functions to induce a vibrational motion to the pan, a solar panel device adapted to convert the energy from the sun into electrical energy for powering the motor and an elongated electrical line coupling the solar panel device and the motor.

3 Claims, 3 Drawing Sheets

SOLAR POWERED APPARATUS FOR TERMINATING FIRE ANTS

BACKGROUND OF THE INVENTION

Field of the Invention

The present invention relates to solar powered apparatus for terminating fire ants and more particularly pertains to killing fire ants with a device powered by solar energy.

Description of the Prior Art

The use of fire ant killers is known in the prior art. More specifically, fire ant killers heretofore devised and utilized for the purpose of killing fire ants are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,580,246 a motor driven apparatus for inducing vibratory action into a person's body comprised of a housing having a shaft rotatably journalled therein by spaced apart bearing means.

U.S. Pat. No. 4,079,249 discloses a motor apparatus for orientating solar responsive devices.

U.S. Pat. No. 4,165,734 discloses a steam generator deriving solar energy by means of a plastic Fresnel lens mounted in a movable framework to follow the sun by means of a manually movable mechanism attached to the steam generator housing.

U.S. Pat. No. 4,751,413 discloses a solar energy motor comprising a plurality of photovoltaic elements, such as solar cells, and armature coils uninstructurally secured to a rotatable axis.

U.S. Pat. No. 5,090,689 discloses a carousel powered by an electric motor, which is connected through a battery to an arrangement of solar cells located on the roof of the carousel.

U.S. Pat. No. Des. 332,650 discloses an ornamental design for a solar powered insect killer, as shown and described.

In this respect, the solar powered apparatus for terminating fire ants according to the present invention substantially departs from the conventional concepts and designs of the prior art, and in doing so provides an apparatus primarily developed for the purpose of killing fire ants with a device powered by solar energy.

Therefore, it can be appreciated that there exists a continuing need for new and improved solar powered apparatus for terminating fire ants which can be used for killing fire ants with a device powered by solar energy. In this regard, the present invention substantially fulfills this need.

SUMMARY OF THE INVENTION

In view of the foregoing disadvantages inherent in the known types of fire ant killers now present in the prior art, the present invention provides an improved solar powered apparatus for terminating fire ants. As such, the general purpose of the present invention, which will be described subsequently in greater detail, is to provide a new and improved Solar Powered Apparatus for Terminating Fire Ants and method which has all the advantages of the prior art and none of the disadvantages.

A new and improved solar powered fire ant terminator comprising a pan with an upper edge and a planar lower surface and side walls therebetween adapted to be set on the ground adjacent to a colony of fire ants, a motor secured with respect to the upper surface of the pan with an output shaft for providing a rotational motion, a cam secured to the output shaft adapted to be rotated upon the activation of the motor, a striker plate secured to one upper edge of the pan adjacent to the rotating cam which functions to induce a vibrational motion to the pan, a quantity of ant killing liquid located within the pan beneath the motor and striker plate, a solar panel device adapted to convert energy from the sun into electrical energy for powering the motor and an elongated electrical line coupling the solar panel device and the motor whereby when the pan is placed in the shade adjacent to a colony of fire ants and the solar cell is placed at a remote location for receiving light energy from the sun, the motor will be energized to rotate the cam adjacent to the striker plate in order to vibrate the pan for generating a condition to draw the fire ants to the motor and into the fluid to effect their death.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved solar powered apparatus for terminating fire ants which have all the advantages of the prior art fire ant killers and none of the disadvantages.

It is another object of the present invention to provide new and improved solar powered apparatus for terminating fire ants which may be easily and efficiently manufactured and marketed.

It is further object of the present invention to provide new and improved solar powered apparatus for terminating fire ants which are of durable and reliable constructions.

An even further object of the present invention is to provide new and improved solar powered apparatus for terminating fire ants which are susceptible of a low cost of manufacture with regard to both materials and labor, and which accordingly are then susceptible of low prices of sale to the consuming public, thereby making such solar powered apparatus for terminating fire ants economically available to the buying public.

Still yet another object of the present invention is to provide new and improved solar powered apparatus for terminating fire ants which provide in the apparatuses and methods of the prior art some of the advantages thereof, while simultaneously overcoming some of the disadvantages normally associated therewith.

Still another object of the present invention is to killing fire ants with a device powered by solar energy.

Lastly, it is an object of the present invention to provide a new and improved solar powered ant terminator comprising a pan with an upper edge and a planar lower surface and side walls therebetween adapted to be set on the ground adjacent to a colony of ants, a motor secured with respect to the upper surface of the pan with an output shaft for providing a rotational motion, a cam secured to the output shaft adapted to be rotated upon the activation of the motor, a striker plate secured to one upper edge of the pan adjacent to the rotating cam which functions to induce a vibrational motion to the pan, a solar panel device adapted to convert the energy from the sun into electrical energy for powering the motor and an elongated electrical line coupling the solar panel device and the motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
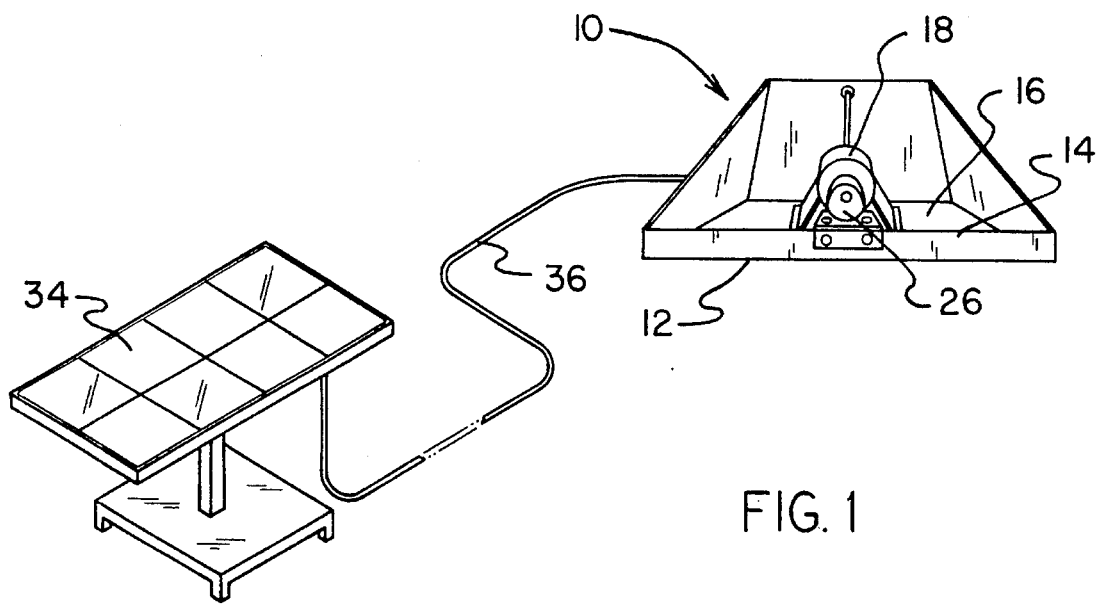
FIG. 1 is a perspective illustration of the preferred embodiment of the new and improved solar powered apparatus for terminating fire ants constructed in accordance with the principles of the present invention.
Figure 2:
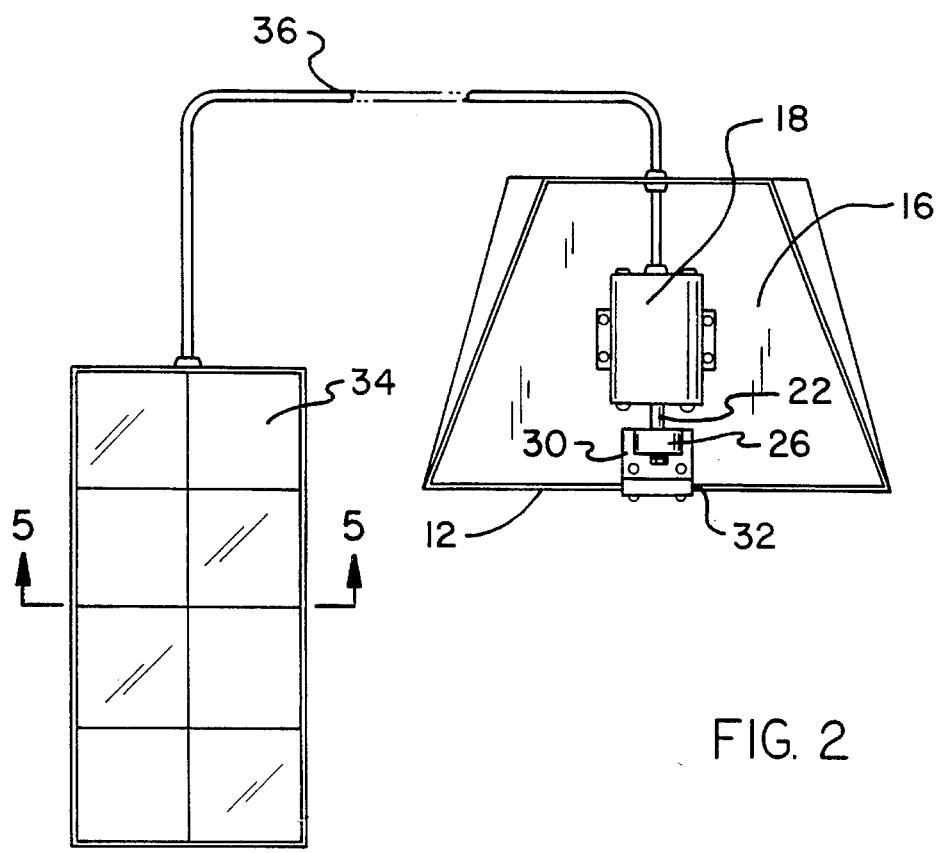
FIG. 2 is an elevational view of the system illustrated in FIG. 1.
Figure 3:
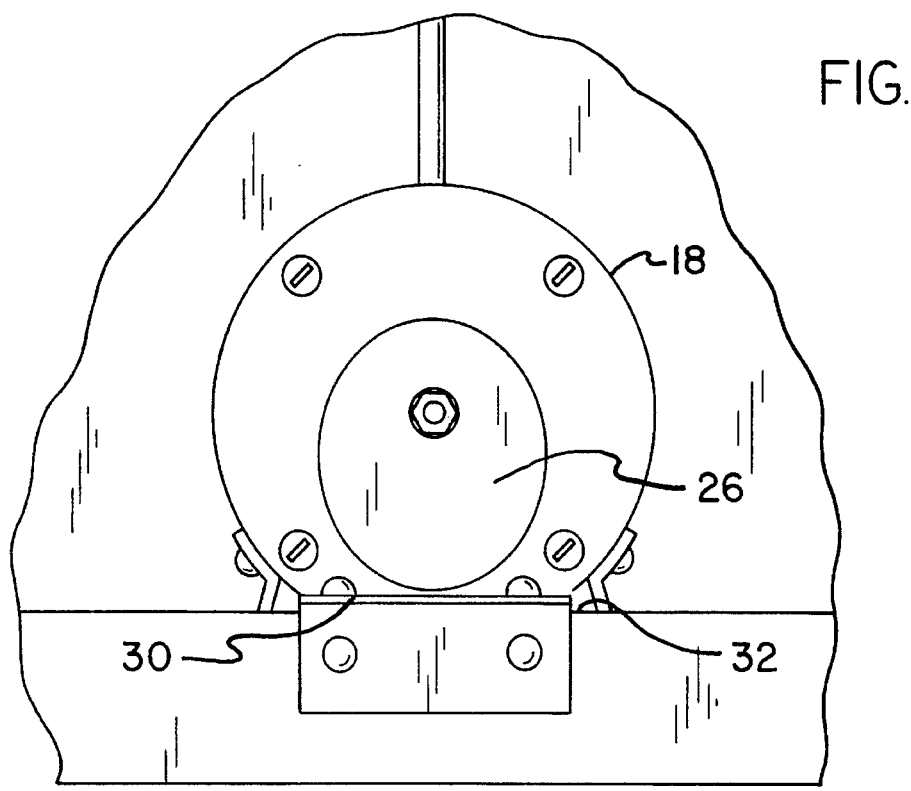
FIG. 3 is an enlarged elevational view of the vibration imparting components of FIGS. 1 and 2.
Figure 4:
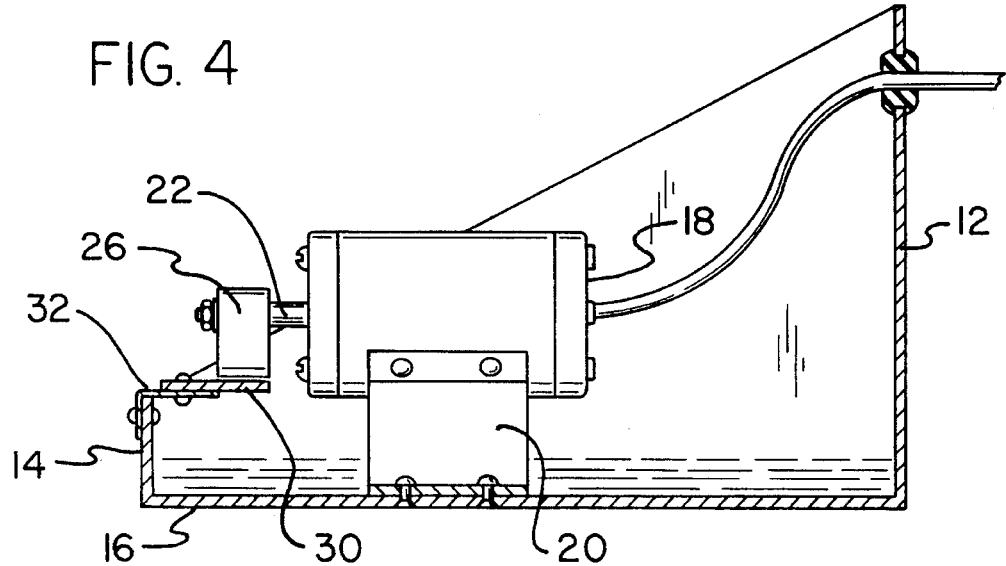
FIG. 4 is a sectional view taken centrally through the pan showing a side elevational view of the motor and vibration imparting mechanism.
Figure 5:
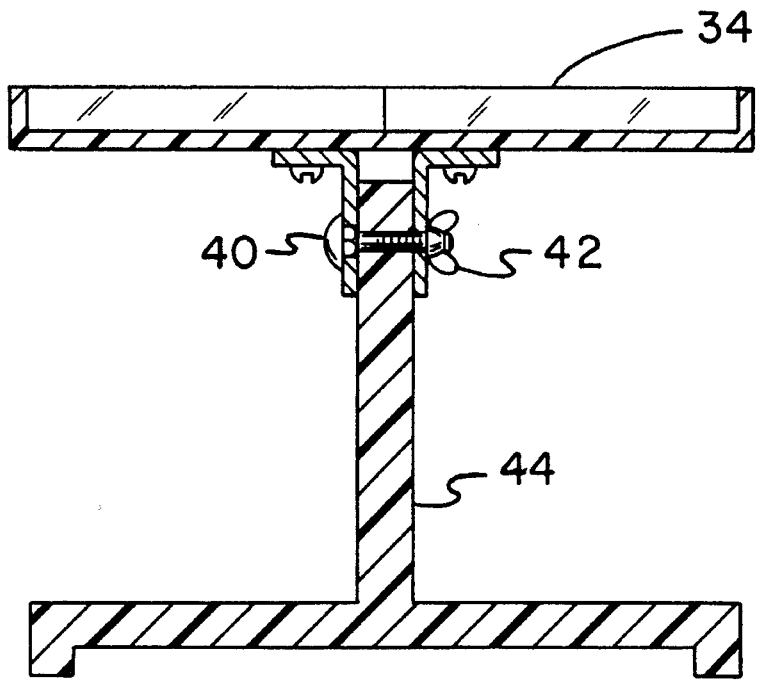
FIG. 5 is a cross-sectional view taken along lines 5—5 of FIG. 2.
Figure 6:
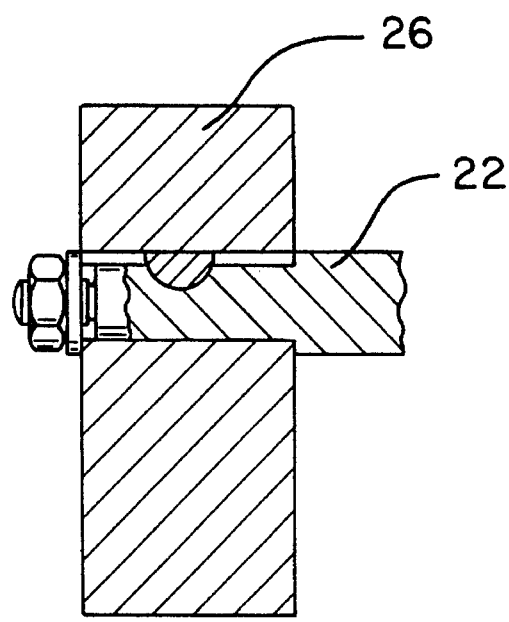
FIG. 6 is a cross-sectional view taken through the vibration imparting mechanism.

With reference now to the drawings, and in particular to FIG. 1 thereof, the preferred embodiment of the new and improved solar powered apparatus for terminating fire ants embodying the principles and concepts of the present invention and generally designated by the reference numeral 10 will be described.

Specifically, the present invention is in a new and improved solar powered apparatus for terminating fire ants which is a system 10. Such system includes a plurality of components including a pan, a motor, a can, a striker plate, a liquid, a solar panel, and an elongated electrical line. Each of the components is individually constructed and correlated with its related components so as to achieve the intended objective.

More specifically, the first component of the system 10 is a pan 12. The pan 12 is in the form of a dish with an upper edge 14 and a lower planar surface 16 with side walls therebetween. The pan 12 is preferably formed as a one-piece unit and is adapted to be set on the ground. Such sitting on the ground is preferably adjacent to a colony of fire ants which normally live in shade under a tree. The one-piece construction of the pan is to allow the positioning of an ant killing liquid therein.

The next major component of the system is a motor 18. Such motor 18 is secured above the lower planar surface of the pan 12. Such support is by rigid support structures 20. The motor 18 is oriented adjacent to the upper surface of the pan 12 in proximity to one edge of the pan 12. As is conventional, the motor 18 has a rotatable output shaft 22. The shaft 22 is adapted to rotate about a horizontal axis with the energization of the motor 18.

Secured to the outward end of the output shaft is a cam 26. The cam 26 is secured to the output shaft for rotation therewith about the common horizontal axis. Like the output shaft, the cam 26 is adapted to be rotated upon the activation of the motor 18.

Next provided in the system 10 of the present invention is a striker plate 30 secured to one upper edge 32 of the pan 12. Secured to the outward end of the output shaft is a cam 26. The cam 26 is secured to the output shaft for vibrational rotation therewith about the common horizontal axis. Like the output shaft, the cam 26 is adapted to be rotated upon the activation of the motor 18. The strike plate 30 is adapted not to contact rotating cam 26. The maximum clearance is about 1/32 of an inch. Cam 26 provides all vibrational motion to complete the unit. Note FIG. 1.

The striker plate 30 is physically secured adjacent to the cam 26 but out of contact therewith. Rotation of the cam will affect a corresponding movement in the edge of the pan 12 and throughout the entire pan 12 but to a lesser degree. The striker plate 30 is adjacent to the rotating cam 26. When the radially extended portion of the cam 26 is in close proximity over the striker plate 30 it will strike, kill and push ants drawn to the vibration. Such ants will be killed immediately or dropped into the liquid therebeneath. When the opposite end of the cam 26 is over the striker plate 30, no contact is made between the cam 26 and striker plate 30. Consequently, no forces are applied to the striker plate and pan 12. This action of the cam 26 periodically vibrating the striker plate 30 the rotation thereof as caused by the energization of the motor 18 will function to induce a vibrational motion to the pan 12 and liquid therein. In this context, such liquid may be any conventional liquid, normally commercially available, for killing fire ants or other like insects when in contact therewith.

Positionable at the location remote from the pan 12 is a solar panel 34. The solar panel 34 is a commercially available device adapted to convert the energy from the sun into electrical energy. Such is done in this invention in the conventional manner. It is the energy from the sun that is converted by the solar panel into electrical energy for powering the motor 18. A bolt 40 and wing nut 42 couple the solar panel 34 with its supporting structure 44 so that the panel 34 may be angled toward the sun for maximum efficiency.

It is normal for fire ants to live in the shade beneath trees. At such locations, however, the solar panels function less than the optimum manner, if at all. As a result, the solar panel 34 of the present invention is preferably positioned at a site remote from the shade tree where the pan 12 is positioned for killing, exterminating or terminating the fire ants. Coupling between the solar panel 34 and motor 18 of the pan is an elongated electrical line 36. Such line couples the solar panel device 34 and the motor 18 in the conventional manner. In this manner, when the pan is placed in the shade adjacent to a colony of fire ants and the solar cell 34 at a remote location out of the shade for receiving light energy from the sun, then the motor will be energized. When so energized, the motor 18 rotates the cam 26 adjacent to the striker plate 30 to thereby vibrate the pan 12 for generating a condition which tends to draw the fire ants to the motor 18 and into the fluid to effect their death.

The present invention kills and traps ants by solar powered vibrations which attract the ants out of the mound whereupon the ants attack the device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved solar powered fire ant terminator comprising, in combination:

a pan with an upper edge and a planar lower surface and side walls therebetween adapted to be set on the ground adjacent to a colony of fire ants;

a motor secured with respect to the upper surface of the pan with an output shaft for providing a rotational motion;

a cam secured to the output shaft adapted to be rotated upon the activation of the motor;

a striker plate secured to one upper edge of the pan adjacent to the rotating cam which functions to induce a vibrational motion to the pan;

a quantity of ant killing liquid located within the pan beneath the motor and striker plate;

a solar panel device adapted to convert energy from the sun into electrical energy for powering the motor; and an elongated electrical line coupling the solar panel device and the motor whereby when the pan is placed in the shade adjacent to a colony of fire ants and the solar cell is placed at a remote location for receiving light energy from the sun, the motor will be energized to rotate the cam adjacent to the striker plate in order to vibrate the pan for generating a condition to draw the fire ants to the motor and into the fluid to effect their death.

2. A solar powered ant terminator comprising:

a pan with an upper edge and a planar lower surface and side walls therebetween adapted to be set on the ground adjacent to a colony of ants;

a motor secured with respect to the upper surface of the pan with an output shaft for providing a rotational motion;

a cam secured to the output shaft adapted to be rotated upon the activation of the motor;

a striker plate secured to one upper edge of the pan adjacent to the rotating cam which functions to induce a vibrational motion to the pan;

a solar panel device adapted to convert the energy from the sun into electrical energy for powering the motor; and an elongated electrical line coupling the solar panel device and the motor.

3. The device as set forth in claim 2 and further including an ant killing fluid within the pan.

* * * * *